(12) United States Patent
Wen et al.

(10) Patent No.: US 8,812,879 B2
(45) Date of Patent: Aug. 19, 2014

(54) PROCESSOR VOLTAGE REGULATION

(75) Inventors: Huajun Wen, Austin, TX (US); Joshua D. Friedrich, Round Rock, TX (US); Norman K. James, Liberty Hill, TX (US); Seongwon Kim, Old Tappan, NJ (US); John R. Ripley, Austin, TX (US); Edmund J. Sprogis, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/650,516

(22) Filed: Dec. 30, 2009

(65) Prior Publication Data
US 2011/0161682 A1 Jun. 30, 2011

(51) Int. Cl.
*G06F 1/26* (2006.01)
*G06F 1/32* (2006.01)

(52) U.S. Cl.
USPC ........... 713/300; 713/323; 713/340; 315/160; 315/164; 315/170; 315/291

(58) Field of Classification Search
USPC .......... 713/300, 323, 340; 315/160, 164, 170, 315/291
See application file for complete search history.

(56) References Cited

U.S. PATENT DOCUMENTS

| | | | |
|---|---|---|---|
| 6,084,771 A | 7/2000 | Ranchy | |
| 6,176,709 B1 * | 1/2001 | Sonobe et al. | 439/69 |
| 6,285,550 B1 | 9/2001 | Belady | |
| 6,452,804 B1 | 9/2002 | Dibene, II | |
| 6,791,846 B2 | 9/2004 | Smith | |
| 6,865,682 B1 * | 3/2005 | Talbot et al. | 713/300 |
| 7,247,930 B2 | 7/2007 | Narendra | |
| 7,279,795 B2 | 10/2007 | Periaman | |
| 7,294,976 B1 * | 11/2007 | Andric et al. | 315/291 |
| 7,420,814 B2 | 9/2008 | Kim | |
| 7,464,280 B2 * | 12/2008 | Morris et al. | 713/323 |
| 8,397,090 B2 * | 3/2013 | Gunther et al. | 713/320 |
| 2003/0081389 A1 * | 5/2003 | Nair et al. | 361/764 |
| 2003/0126477 A1 * | 7/2003 | Zhang et al. | 713/300 |
| 2004/0130303 A1 * | 7/2004 | Pohlman et al. | 323/272 |
| 2005/0071693 A1 * | 3/2005 | Chun et al. | 713/300 |
| 2005/0134242 A1 * | 6/2005 | Gradinariu | 323/282 |
| 2006/0065962 A1 | 3/2006 | Narendra | |
| 2006/0099734 A1 * | 5/2006 | Narendra et al. | 438/107 |
| 2006/0261793 A1 * | 11/2006 | Carpenter et al. | 323/282 |
| 2006/0279267 A1 * | 12/2006 | Burton et al. | 323/282 |
| 2007/0013080 A1 * | 1/2007 | DiBene et al. | 257/777 |

(Continued)

*Primary Examiner* — Vincent Tran
(74) *Attorney, Agent, or Firm* — James L. Baudino

(57) ABSTRACT

A voltage regulator module (VRM) includes a first interface configured to couple to a first substrate interface at a first voltage. The VRM also includes a second interface configured to couple to a first processor interface at a second voltage. A first regulator module couples to the first interface and to the second interface. The first regulator module is configured to receive power at the first interface, to convert power to the second voltage, and to deliver power to the first processor interface at the second voltage. A method for providing power to a processor includes receiving power from a first substrate interface at a first voltage. The received power is regulated to generate power at a second voltage. The regulated power is provided to a processor at a first processor interface coupled to the processor. The processor interface delivers power to a logic group of a plurality of logic groups of the processor.

11 Claims, 7 Drawing Sheets

(56) References Cited

U.S. PATENT DOCUMENTS

| | | |
|---|---|---|
| 2007/0023878 A1 | 2/2007 | Burton |
| 2007/0070673 A1* | 3/2007 | Borkar et al. .................. 365/63 |
| 2008/0116589 A1 | 5/2008 | Li |
| 2008/0172565 A1* | 7/2008 | Chu et al. ...................... 713/300 |
| 2008/0288720 A1 | 11/2008 | Atwal |
| 2009/0001543 A1 | 1/2009 | Chung |
| 2009/0309204 A1* | 12/2009 | Ha ................................ 257/686 |
| 2011/0083021 A1* | 4/2011 | Floyd et al. .................. 713/300 |

* cited by examiner

PROCESSOR VOLTAGE REGULATION

BACKGROUND

The present invention relates generally to the field of computer processor power supply and, more particularly, to a system and method for improved processor voltage regulation.

Modern electronic computing systems, such as microprocessor systems, often include electronic circuitry organized into discrete logic groups. In many cases, one or more of these logic groups are not necessary for every operation. For the purposes of power reduction, some systems restrict power to these logic groups during periods of inactivity, a process sometimes referred to as "power gating".

Power gating has been widely used in very large scale integration (VLSI) designs to reduce or eliminate standby leakage by cutting off the power supply to inactive or "standby" circuits. Current power gating techniques typically employ on-chip circuits as footer or header devices to connect/disconnect standby circuits from their power supplies. While the footer/header approaches allow for power gating individual logic groups, these approaches also suffer from significant drawbacks.

For example, the footer/header devices themselves consume valuable chip area, which either reduces the area available for other functions or requires larger chips. In some cases, design and/or operational requirements preclude larger chips, which means that the designer must sacrifice functionality to achieve gains in power supply control. Where functionality cannot be sacrificed, designers sometimes must use fewer footer/header devices than are truly necessary, which increases resistance and noise on the power distribution networks.

Additionally, most footer/header techniques must also double the chip's distributed power supply networks. That is, typical footer techniques require a "virtual ground" to be distributed in parallel with a true ground. Similarly, typical header techniques require a "virtual VDD," distributed in parallel with VDD. In many cases, on-chip interconnect wires are limited in availability, which limits the options for distributing virtual ground and/or virtual VDD. This limited availability often compromises noise immunity and IR drop, especially on virtual ground networks. This, in turn, directly degrades circuit frequency and performance.

Further, typical power supply lines from the motherboard (or module substrate, to which the processor couples) are limited and/or insufficient in satisfying the power requirements of advanced processors. That is, multi-core and/or multi-function processors sometimes require individual power supplies for each core/function, in order to optimize power consumption and/or performance. Typical processor power supply techniques, including common header/footer approaches, cannot meet these power demands without unsatisfactory compromises in chip size and/or on-chip area.

SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

In one embodiment, a voltage regulator module (VRM) includes a first interface configured to couple to a first substrate interface at a first voltage. The VRM also includes a second interface configured to couple to a first processor interface at a second voltage. A first regulator module couples to the first interface and to the second interface. The first regulator module is configured to receive power at the first interface, to convert power to the second voltage, and to deliver power to the first processor interface at the second voltage.

In another embodiment, a method for providing power to a processor includes receiving power from a first substrate interface at a first voltage. The received power is regulated to generate power at a second voltage. The regulated power is provided to a processor at a first processor interface coupled to the processor. The processor interface delivers power to a logic group of a plurality of logic groups of the processor.

BRIEF DESCRIPTION OF THE SEVERAL VIEWS OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
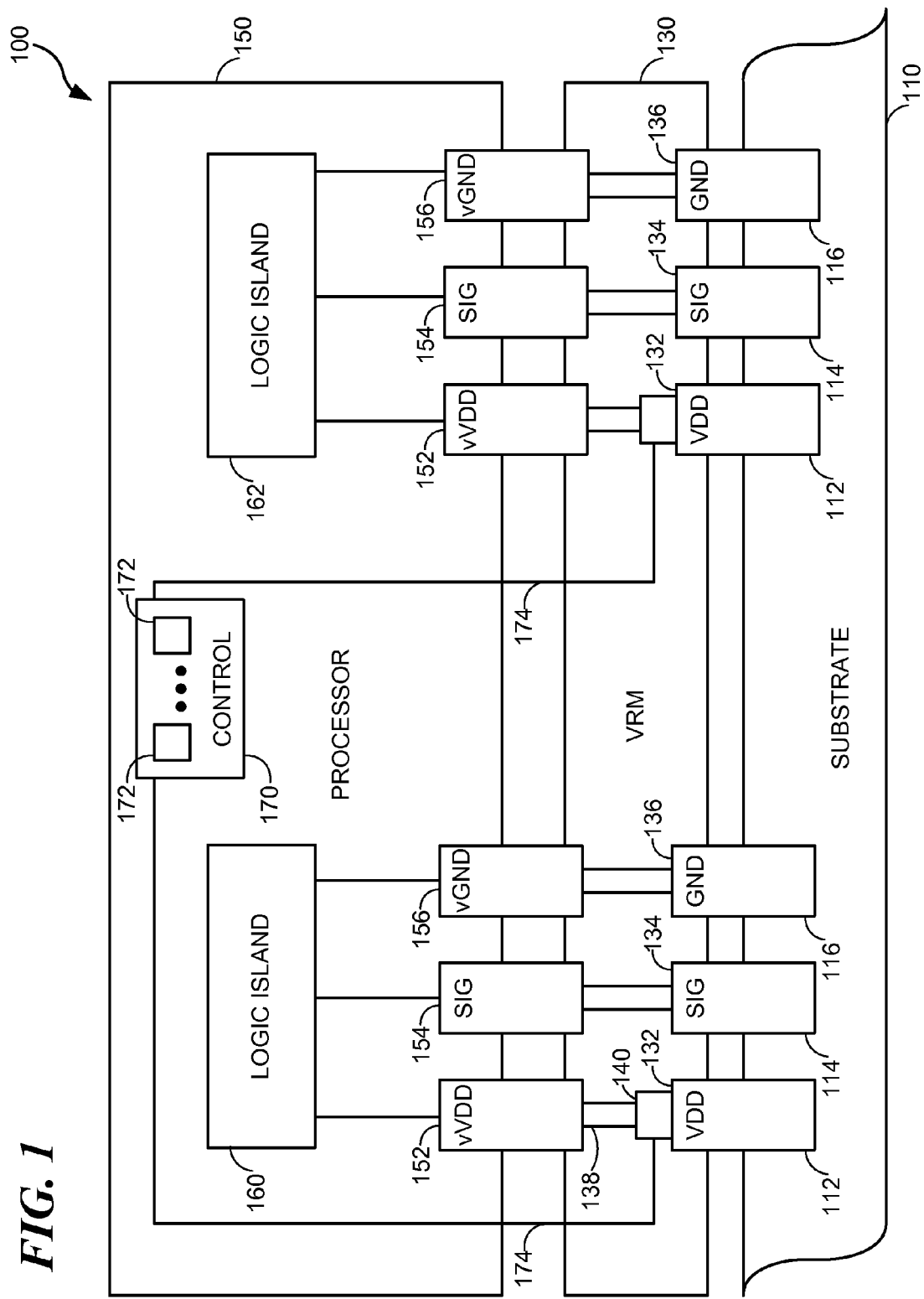
FIG. 1 illustrates a block diagram showing a processor system with a voltage regulator module, in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 is a high-level block diagram illustrating certain components of a system 100 for improved processor voltage regulation and power distribution, in accordance with a preferred embodiment. System 100 includes a substrate 110, a voltage regulation module (VRM) 130, and a processor 150.

Very broadly, in operation in one embodiment, VRM 130 receives power (as electric current delivered at voltage VDD), ground (GND) connections, and various signals (SIG) from substrate 110. In response to one or more control signals from processor 150, VRM 130 passes a regulated power supply (in the form of current delivered at voltage vVDD ("virtual VDD")) to the power interfaces on processor 150. Processor 150 distributes received power to one or more groups of circuits ("logic islands"). Processor 150 controls the power delivered to the logic islands by manipulating the control signals processor 150 sends to VRM 130. Generally, in one embodiment, VRM 130 passes the ground connection and signals from substrate 110 to processor 150 substantially unchanged. The disclosed embodiments, as described in more detail below, offer significant advantages over previous approaches.

As shown, system 100 includes substrate 110, which is an otherwise conventional substrate. In one embodiment, for example, substrate 110 is a computer system motherboard. Substrate 110 is configured to deliver various power and ground connections to a processor, and to send and receive various signals to and from the processor. In the illustrated embodiment, substrate 110 includes a plurality of substrate interfaces 112, configured to deliver power at a pre-determined voltage, VDD. In one embodiment, substrate 110 is configured to deliver a plurality of different voltages, as described in more detail below. In one embodiment, substrate interface 112 is a Controlled Collapse Chip Connection (C4).

In the illustrated embodiment, substrate 110 includes a plurality of signal interfaces 114. Generally, signal interface 114 is configured to provide a signal line for electrical signals to pass to/from substrate 110. In the illustrated embodiment, substrate 110 also includes a plurality of ground interfaces 116. Generally, ground interface 116 is configured to provide a connection to electrical ground. In one embodiment, signal interface 114 and ground interface 116 are both C4 connections.

In the illustrated embodiment, VRM 130 couples to substrate 110. Specifically, VRM 130 includes a substrate power interface 132. Interface 132 is configured to receive power from substrate 110 at voltage VDD. In one embodiment, power interface 132 is a C4 connection.

VRM 130 includes a regulator 140 coupled to interface 132. As described in more detail below, regulator 140 receives control signals 174 from processor 150. In response to received control signals, as described in more detail below, regulator 140 regulates power delivered to processor 150 at a virtual VDD (vVDD) interface 152 of processor 150. In one embodiment, regulator 140 includes a linear voltage regulator. In one embodiment, regulator 140 includes a fast micro-regulator.

As described in more detail below, in one embodiment, regulator 140 is configured for global reference voltages, wherein each regulator 140 regulates voltage in reference to a value common to all regulators 140. In an alternate embodiment, regulator 140 is configured for local reference voltages, wherein each regulator 140 regulates voltage in reference to a value measured or received by that particular regulator 140. In an alternate embodiment, regulator 140 is configured for both local and global reference voltages.

In the illustrated embodiment, VRM 130 includes a "through silicon via" (TSV) 138. As shown, TSV 138 couples interface 132 (and regulator 140) to interface 152. In one embodiment, TSV 138 is an otherwise conventional TSV. In one embodiment, TSV 139 is configured with a minimized resistance. In one embodiment, minimized TSV resistance reduces IR drop.

In the illustrated embodiment, VRM 130 includes a plurality of signal interfaces 134. Generally, signal interface 134 is configured to provide a signal line for electrical signals to pass between substrate 110 and VRM 130. In the illustrated embodiment, an otherwise conventional TSV couples signal interface 134 to a signal interface 154 of processor 150. In one embodiment, signal interface 134 is a C4 connection.

In the illustrated embodiment, VRM 130 also includes a plurality of ground interfaces 136. Generally, ground interface 136 is configured to provide a connection to the electrical ground connection of substrate 110. In the illustrated embodiment, an otherwise conventional TSV couples ground interface 136 to a ground interface 156 of processor 150. In one embodiment, ground interface 136 is a C4 connection.

In the illustrated embodiment, processor 150 includes a plurality of signal interfaces 154. Generally, signal interface 154 is configured to provide a signal line for electrical signals to pass between processor 150 and VRM 130. In the illustrated embodiment, processor 150 also includes a plurality of ground interfaces 156. Generally, ground interface 156 is configured to provide a connection to the electrical ground connection of VRM 130. In one embodiment, signal interface 154 and ground interface 156 are both C4 connections.

In the illustrated embodiment, processor 150 includes a plurality of "logic islands," also sometimes referred to as "logic groups." Generally, in one embodiment, logic islands are groups of circuits arranged to share a common target vVDD and are typically inactive during the same operations. In one embodiment, a logic island is a group of functions arranged to share a common target vVDD, each function being configured for independent power gating. In the illustrated embodiment, processor 150 includes logic islands 160 and 162. In one embodiment, processor 150 is a multi-processor chip and logic islands 160 and 162 are individual cores.

In the illustrated embodiment, processor 150 includes control module 170. Generally, control module 170 is configured to provide control signals 174 to VRM 130. In one embodiment, control module 170 provides control signals 174 to regulate and/or gate power to one or more logic islands. In one embodiment, control module 170 includes a plurality of sub-modules 172, each of which is associated with a particular logic island, and which generate control signals operable to regulate and/or gate power to its associated logic island. Thus, in one embodiment, control signals 174 are configured to turn power off and on to each logic island 160 and 162, individually.

Thus, FIG. 1 illustrates system 100 in a high-level three-dimensional ("3D") layout with a 3D VRM module 130 bonded face-to-face to processor 150 through C4 connections. Further, VRM 130 includes TSVs at each C4 location to transfer regulated power (VDD), ground, and logic signals from substrate 110 to processor 150. In one embodiment, VRM 130 is bonded face-to-face to processor 150 so as to minimize the communication distance between VRM 130 and processor 150 and/or between processor 150 and substrate 110.

In one embodiment, VRM 130 is configured to match the substrate 110 C4 footprint. As used herein, a C4 "footprint" is the collection of sizes and arrangement of relative locations of C4 interface connections within a particular area. As such, the substrate 110 C4 footprint refers to the arrangement and sizes of the C4 connections within the substrate 110 area intended to couple to VRM 130 and/or processor 150.

In one embodiment, VRM 130 is configured to match a standard substrate 110 C4 footprint. So configured, a system designer can select between systems including VRM 130 and systems wherein processor chip 150 bonds to substrate 110 without a VRM 130, without having to choose between alternate substrate 110 C4 footprint configurations. Moreover, so configured, VRM 130 can also be deployed in some systems without reconfiguring that system's substrate 110 C4 footprint.

In one embodiment, each C4 connection of VRM 130 can be configured as the same size or smaller C4 connection as the corresponding interface of substrate 110. In one embodiment, the VRM 130 C4 footprint does not strictly match the substrate 110 C4 footprint. For example, in one embodiment, the processor-side of VRM 130 includes additional C4 interfaces configured to transfer internal signals between processor 150 and VRM 130, for control and communication purposes.

In the illustrated embodiment, VRM 130 includes a plurality of regulators 140. In one embodiment, VRM 130 includes a regulator 140 at each power interface 132. In one embodiment, each regulator 140 includes a local sensing and feedback module, described in more detail below. Exemplary configurations of power interface 132 and regulator 140 are described in more detail below.

Figure 2:
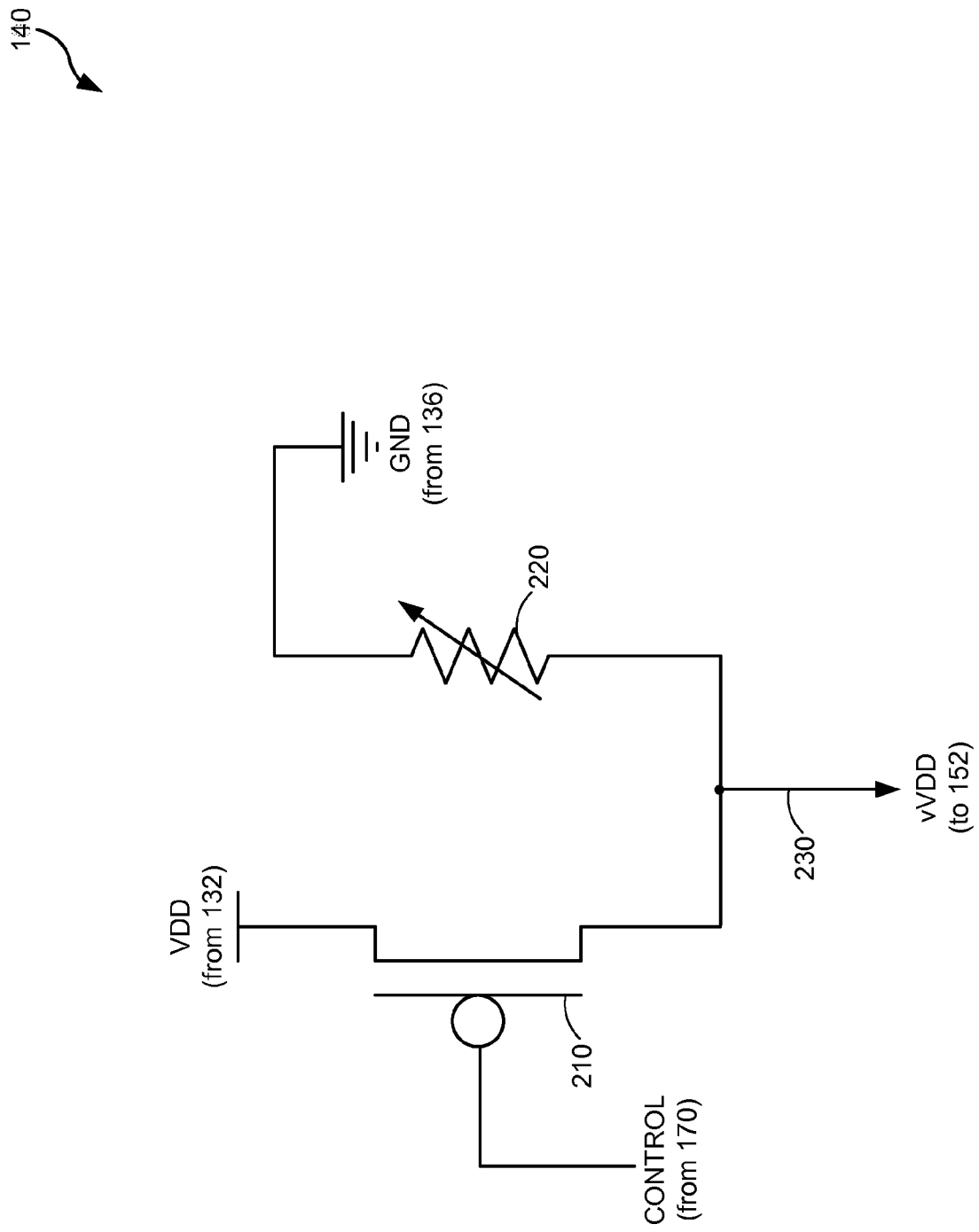
FIG. 2 illustrates a schematic diagram showing a voltage regulator of a voltage regulator module, in accordance with a preferred embodiment.

For example, FIG. 2 illustrates an exemplary regulator 140 configured as a header device, in accordance with one embodiment. In the illustrated embodiment, regulator 140 includes CMOS PFET 210 and variable resistor 220. As described in more detail below, regulator 140 produces a virtual VDD (vVDD) for distribution to a processor on TSV 230.

In one embodiment, each regulator 140 includes a PFET 210. In the illustrated embodiment, TSV 230 couples to an interface 152 providing power to a logic island of processor 150. In one embodiment, each logic island of processor 150 couples to a dedicated regulator 140. In the illustrated embodiment, a control signal from control module 170 controls the gate of PFET 210. Thus, control module 170 can turn PFET 210 on and off according to the particular configuration of PFET 210.

In the illustrated embodiment, when the control signal is ON, PFET 210 is open, bringing the voltage at TSV 230 to vVDD, based on the voltage VDD from the substrate module 132, thereby providing power to processor module 152. Similarly, when the control signal is OFF, PFET 210 is closed, disconnecting TSV 230 from substrate module 132, thereby gating power to processor module 152.

In one embodiment, both power from substrate module 132 (VDD) and power from TSV 230 are distributed in networks configured to lower IR drop and achieve improved noise immunity. Additionally, in one embodiment, the distribution networks are configured with low-resistance metal lines, and regulator 140 includes a plurality of PFETs 210. So configured, regulator 140 causes a reduced IR drop between VDD and vVdd, thereby reducing power dissipation.

In the illustrated embodiment, regulator 140 also includes variable resistor 220. In one embodiment, variable resistor 220 is configured to support standalone testing of the VRM in which regulator 140 is employed, before that VRM is bonded to a processor chip. In one embodiment, variable resistor 220 is controlled by a test signal and can be probed at the module-side C4 interfaces 132 and/or 136.

Figure 3:
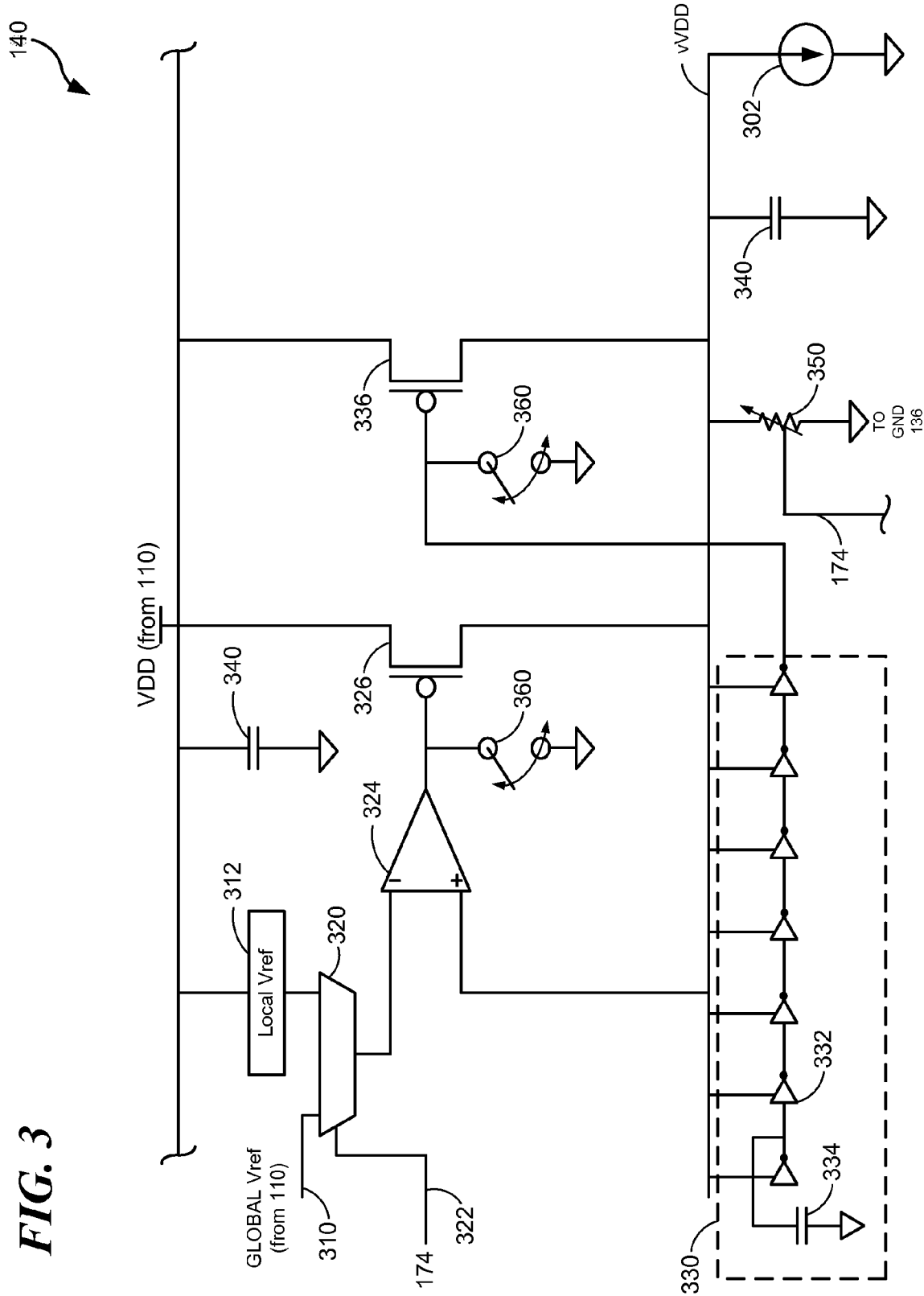
FIG. 3 illustrates a schematic diagram showing a voltage regulator of a voltage regulator module, in accordance with a preferred embodiment.

As shown, FIG. 2 illustrates one embodiment of regulator 140. FIG. 3 illustrates a schematic diagram of a regulator 140 of VRM 130 in accordance with another embodiment. Very broadly, in the illustrated embodiment, regulator 140 includes a linear regulator and a micro-regulator, as described in more detail below.

As shown, regulator 140 couples to substrate interface 132. Regulator 140 also couples to ground interface 136 and control line 174. In response to control signals from processor 150, regulator 140 provides power at vVDD to processor 150, represented in FIG. 3 as load 302. As described above, in one embodiment, load 302 is a single logic island 160.

In the illustrated embodiment, regulator 140 includes a connection to a global reference voltage (Vref) 310. In one embodiment, substrate 110 supplies global Vref 310. In an alternate embodiment, VRM 130 supplies global Vref 310. Regulator 140 also includes a local Vref 312. In one embodiment, local Vref 312 is a conventional reference voltage generator.

In the illustrated embodiment, global Vref 310 and local Vref 312 are inputs to an otherwise conventional multiplexor (mux) 320. In one embodiment, VRM 130 selects between global Vref 310 and local Vref 312 through select line 322. In an alternate embodiment, processor 150 selects between global Vref 310 and local Vref 312 through select line 322.

The output of mux 320 is one input to an otherwise conventional op amp 324. The output of op amp 324 controls the gate of a CMOS PFET 326. The other input of op amp 324 is a feedback line from PFET 326. As illustrated, one source/drain of PFET 326 couples to the other input to op amp 324. Together, local Vref 312, op amp 324, PFET 326, and the feedback line form a linear regulator.

In the illustrated embodiment, regulator 140 also includes micro-regulator 330. In one embodiment, micro-regulator 330 is self-biased. In the illustrated embodiment, includes a chain of inverters 332 and a capacitor 334. In one embodiment, the chain of inverters 332 is a voltage amplifier. In the illustrated embodiment, the input to micro-regulator 330 couples to the feedback loop of the linear regulator. In the illustrated embodiment, the output of micro-regulator 330 couples to the gate of a CMOS PFET 336.

In one embodiment, micro-regulator 330 is configured with a faster response time than the linear regulator, and operates in a bandwidth of 200 Mhz-5 Ghz, and the linear regulator operates in a bandwidth of DC-200 Mhz. As such, in the illustrated embodiment, the combined bandwidth of the linear regulator and micro-regulator 330 greatly reduces both noise from input power supply and noise induced by load variation.

In the illustrated embodiment, regulator 140 also includes decoupling capacitors 350, configured as shown. In one embodiment, decoupling capacitors 350 are disposed near the VDD and vVDD nodes. So configured, decoupling capacitors 350 reduce higher frequency noise caused by load variation.

In the illustrated embodiment, regulator 140 includes a variable resistor 350. As described above, resistor 350 can be configured to respond to control signals from processor 150 and/or VRM 130. In one embodiment, resistor 350 is configured as a dummy load for stand-alone testing of VRM 130, and can be probed at the module-side C4 interfaces 132 and/or 136.

In operation, in one embodiment, regulator 140 maintains an output vVDD equal to Vref (global Vref 310 or local Vref 312). So configured, regulator 140 reduces mismatches between regulators 140 serving the same logic island. As described above, in one embodiment, regulators 140 serving the same logic island are designed to have the same reference voltage point. In one embodiment, the reference voltage is set by control logic on processor 150.

In one embodiment, regulator 140 is configured to adjust vVDD continuously in 10 mV intervals, with dropout voltage as low as 5% of VDD. In one embodiment, regulator 140 is configured to set vVDD=0 by turning OFF PFETs 326 and 336, and setting variable resistor 350 to provide a path to ground.

In one embodiment, regulator 140 also includes bypass switches 360. In the illustrated embodiment, bypass switches 360 are coupled to the gates of PFETs 326 and 336 and are configured to connect the PFET gate nodes directly to ground. In this "bypass" state, PFETs 326 and 336 are fully ON, with resistance approaching zero. So configured, regulator 140 allows vVDD to match VDD. In one embodiment, PFETs 326 and/or 336 are configured in a half-open initial state. So configured, regular 140 can be tuned to improve performance. In one embodiment, VRM 130 controls bypass switches 360. In an alternate embodiment, processor 150 controls bypass switches 360.

Figure 4:
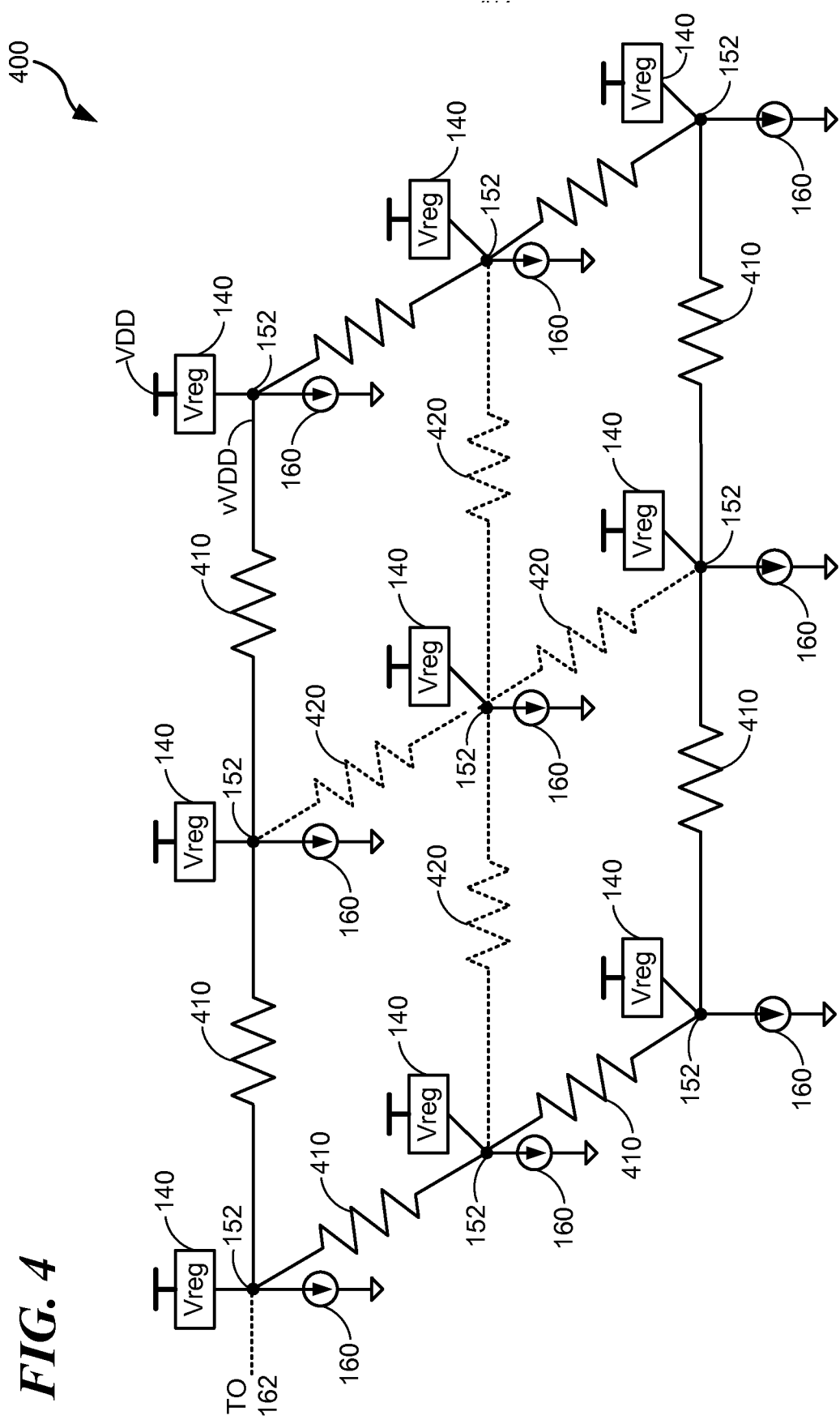
FIG. 4 illustrates a schematic diagram showing a power distribution network including voltage regulator modules, in accordance with a preferred embodiment.

FIG. 4 illustrates a schematic view of a power distribution network including voltage regulator modules in accordance with one embodiment. In the illustrated embodiment power distribution network 400 includes a plurality of regulators 140 couple to a logic island 160 at multiple interfaces 152. In one embodiment, each regulator 140 operates independent from other regulators 140. In the illustrated embodiment, all of the regulators 140 share a common Vref voltage reference point. Additionally, in one embodiment, each regulator 140 also includes a local voltage sensor (such as a local Vref 312, for example) and feedback loop. In one embodiment, the regulators maintain the variation of vVDD below 10 mV of any interface 152.

In one embodiment, the plurality of interfaces 152 are C4 connections. In the illustrated embodiment, the plurality of interfaces 152 are coupled together through interconnect resistive lines 410 and "dotted" interconnect resistive lines 420. In one embodiment, lines 420 are configured as low-resistance metal lines. In one embodiment, lines 410 and 412 together reduce input plane variation. In one embodiment, the interconnect resistance of lines 410 and 420 is in the range of 0.1 to 1.0 ohms.

Figure 5:
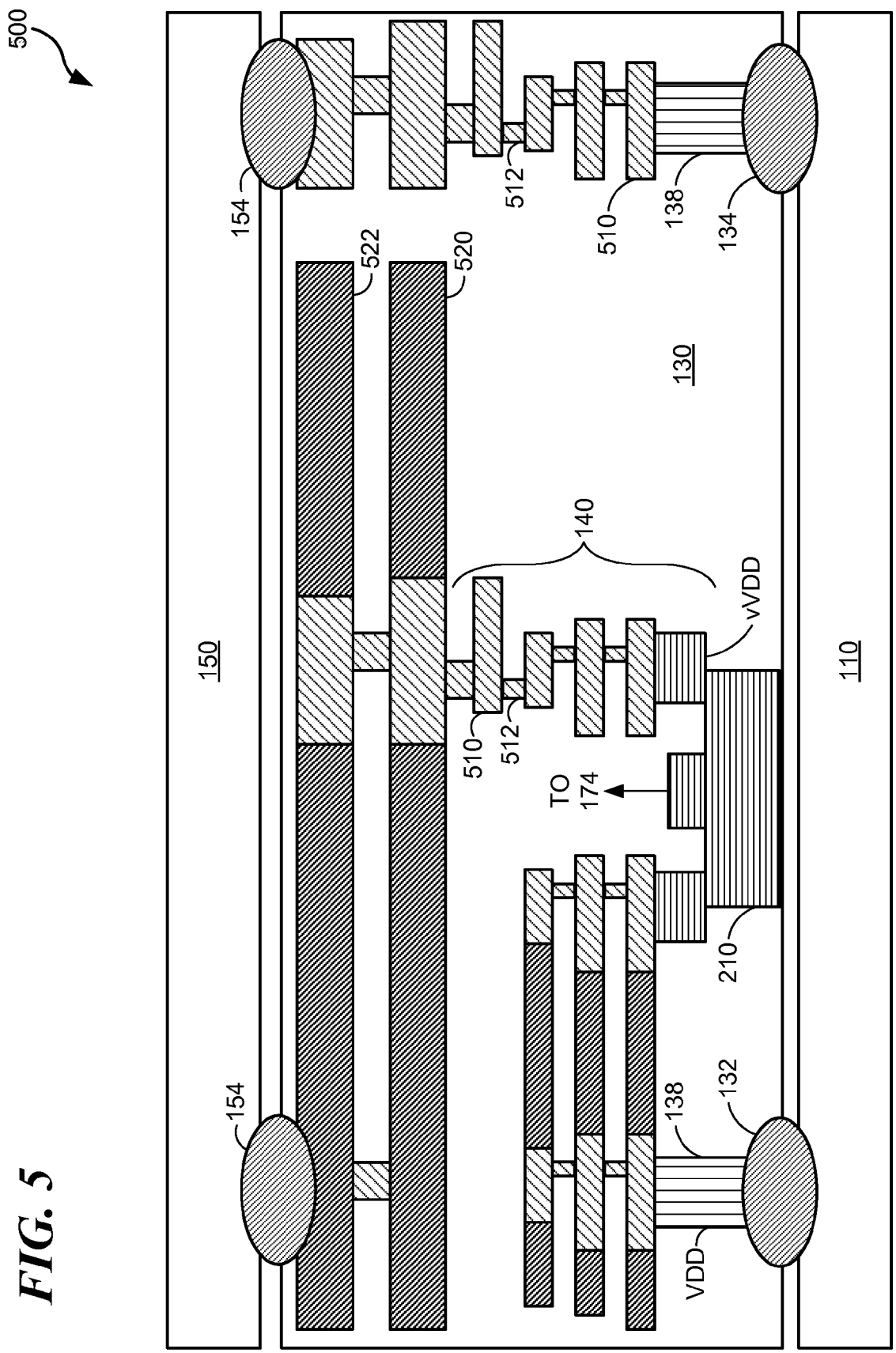
FIG. 5 illustrates a side-view of a semiconductor device implementation of a voltage regulator module, in accordance with a preferred embodiment.

FIG. 5 illustrates a side-view of a semiconductor device implementation of a voltage regulator module, in accordance with one embodiment. Specifically, a substrate 110 couples to a processor 150 through a VRM 130 as described above. As shown, VRM 130 includes a plurality of metal layers 510 coupled though interstitial connections (or "vias") 512. Also shown are vVDD distribution layers 520 and 522, which are configured to couple together regulators 140 of VRM 130 to form a vVDD distribution network.

In the illustrated embodiment, both a vVDD connection and an exemplary signal connection are shown. For example, power arrives at C4 connection 132 (at VDD), which couples to TSV 138, which couples to a PFET 210 of regulator 140 at one source/drain. The opposite source/drain is at vVDD, which power regulator 140 distributes to distribution layers 520 and 522 through the metal layers 510 and vias 512 as shown.

In one embodiment, passing high current from VDD TSV to the distribution layers requires sufficient low level vias 512 (at traditional layers CA, V1, and V2, for example) and low-resistance metal layers 510. In one embodiment, the output that forms a vVDD plane is similarly configured. As such, careful design of the VDD and vVDD distribution grids can achieve an IR drop of less than 1% of VDD. In the illustrated embodiment, interfaces 152 and 154 are not visible to substrate 110. In one embodiment, interfaces 152 and 154 and C4 interfaces and are configured as a plurality of smaller C4 interfaces as compared to interfaces 132 and 136.

Figure 6:
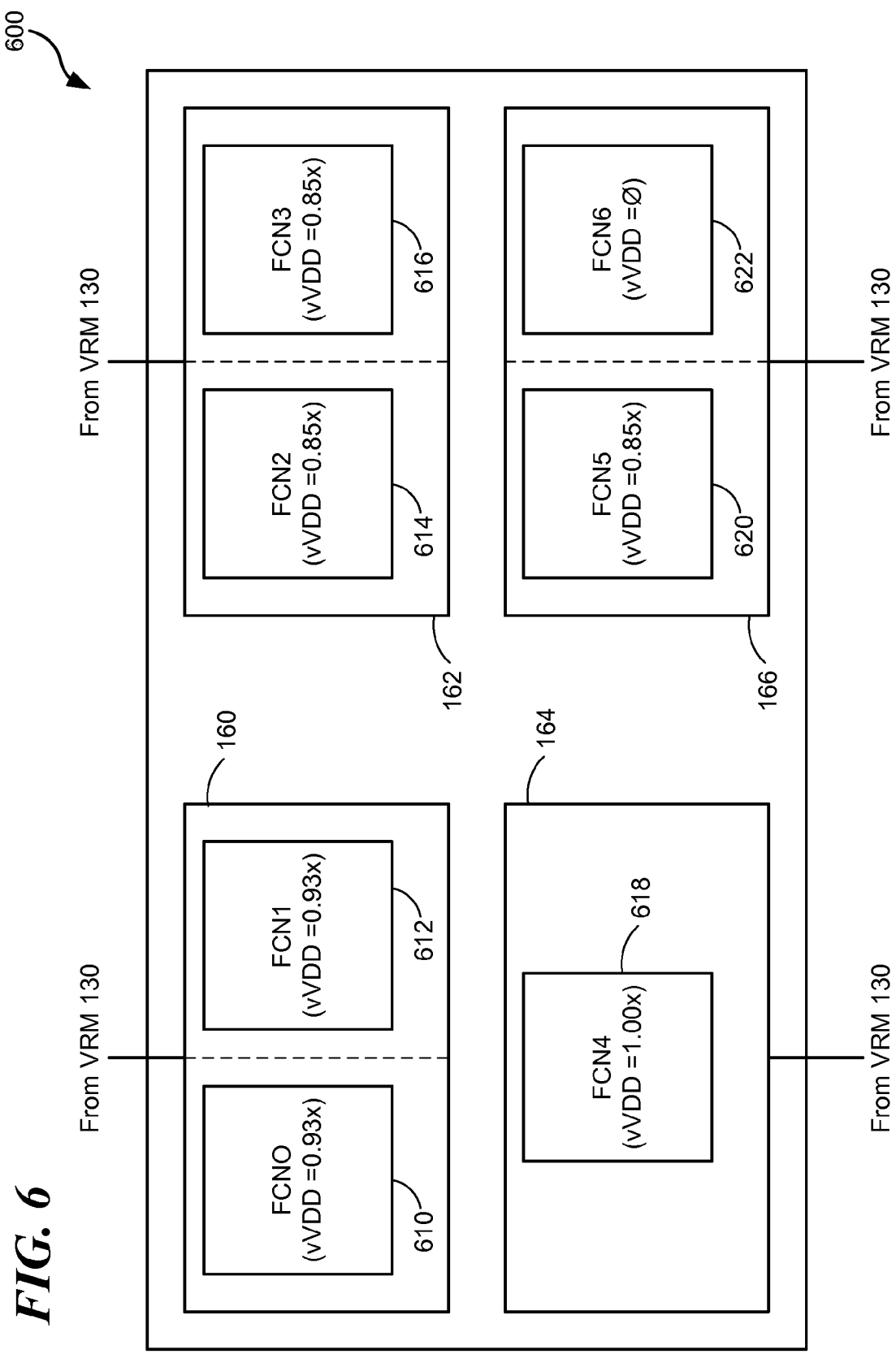
FIG. 6 illustrates a high-level block diagram of a power distribution network of a system employing a voltage regulator module, in accordance with a preferred embodiment.

FIG. 6 illustrates a high-level block diagram of a power distribution network of a system employing a voltage regulator module, in accordance with one embodiment. In particular, FIG. 6 illustrates a system 600 that includes a plurality of logic islands of a processor 150 coupled to a VRM 130. In the illustrated embodiment, VRM 130 receives power at 1.0×V of VDD and provides power to the various logic islands as a fraction of that power.

For example, logic island 160 includes function (0) 610 and function (1) 612. VRM 130 provides power to logic island 160 at 0.93×VDD. Similarly, logic island 162 includes function (2) 614 and function (3) 616. VRM 130 provides power to logic island 162 at 0.85×VDD. Logic island 164 includes function (4) 618. VRM 130 provides power to logic island 162 at 1.00×VDD. Thus, VRM 130 can be configured to provide variable vVDD to logic islands of a processor.

Furthermore, VRM 130 can be configured to provide variable vVDD to different functions of the same logic island. For example, logic island 166 includes function (5) 620 and function (6) 622. VRM 130 provides power to function 620 at 0.85×VDD, but because function 622 is turned off, vVDD for function 622 is 0 V (or 0.0×VDD). Thus, as described above, power consumed by logic island 166 can be reduced by gating power to unused functions.

In one embodiment, the settings for VDD input and individual vVDD values for each logic island and/or function are determined by chip frequency sorting. In one embodiment the VDD/vVDD settings are configured to use the lowest vVDD for each function and to achieve overall power reduction. In one embodiment, losses from linear regulators and power distribution networks of VRM 130 require an the input VDD higher than for the vVDD required by the destination processor 150. In one embodiment, the input VDD value is determined based on the slowest function of the processor.

In one embodiment, VRM 130 and processor 150 are configured such that processor power dissipation is proportional to $(vVDD)^3$ and losses in VRM 130 are proportional to $(VDD-vVDD)^2$. As described above, in one embodiment, one or more regulators 140 of VRM 130 can be bypassed to minimize power consumption. As described above, processor 150 can also be configured to employ control signals to gate or reduce power to one or more unused functions.

Figure 7:
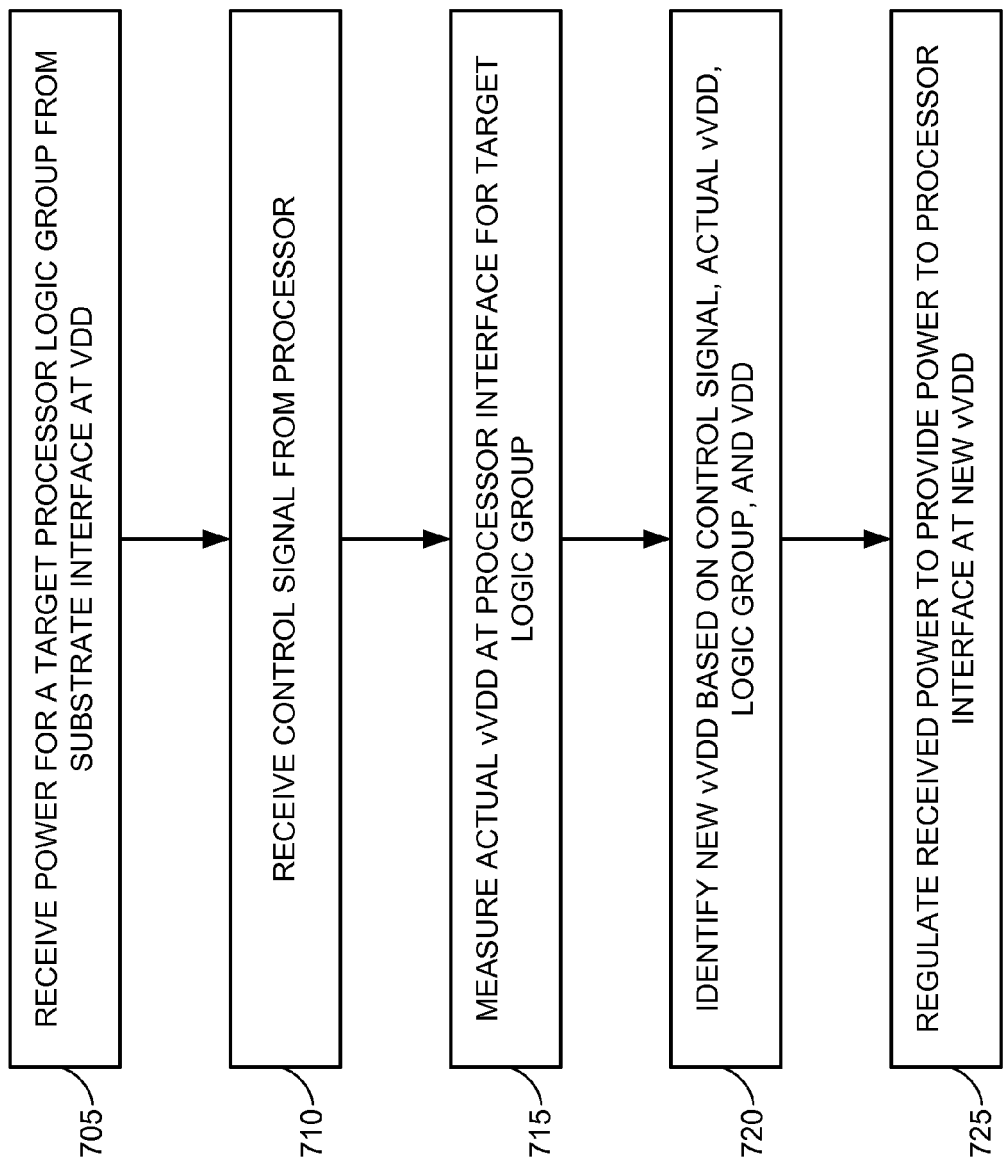
FIG. 7 illustrates a high-level flow diagram depicting logical operational steps of an improved voltage regulation method, which can be implemented in accordance with a preferred embodiment.

FIG. 7 illustrates a high-level flow diagram depicting logical operational steps of an improved voltage regulation method, which can be implemented in accordance with a preferred embodiment. Specifically, FIG. 7 illustrates a high-level flow chart 700 that depicts logical operational steps performed by, for example, VRM 130 of FIG. 1, which may be implemented in accordance with a preferred embodiment.

As indicated at block 705, the process begins, wherein VRM 130 receives power at VDD for a target processor 150 logic group from a substrate interface. Next, as indicated at block 710, VRM 130 receives a control signal from processor 150. As described above, control signals from processor 150 can be configured to specify a desired vVDD for one or more logic groups (or "logic islands").

Next, as indicated at block 715, VRM 130 measures the actual vVDD at the processor interface for the target logic group. As described above, in one embodiment, VRM 130 instead receives a reference voltage Vref. In an alternate embodiment, VRM 130 measures the actual vVDD and also receives a reference voltage Vref (global or local).

Next, as indicated at block 720, VRM 130 identifies a new vVDD based on the received control signal(s), actual vVDD (and/or reference Vref), and/or the input VDD. As described above, in one embodiment the new vVDD is a fraction of the input VDD as selected by the control signals.

Next, as indicated at block 725, VRM 130 regulates received power (at VDD) to provide power to the processor interface at the new vVDD. As described above, in one embodiment, VRM 130 regulates received power by a linear regulator coupled to a reference voltage Vref. In an alternate embodiment, VRM 130 regulates received power by turning ON or OFF bypass switches.

Generally, systems employing the process disclosed in FIG. 7 operate continuously and therefore are frequently changing which functions and/or logic islands are in use at any given time. As such, these systems can be configured to perform multiple iterations of the process disclosed in FIG. 7.

Accordingly, the embodiments disclosed herein provide for implementing power gating and voltage regulation circuits (VRM 130) on a discrete chip that is bonded to a processor chip through three-dimensional integration technology. In some embodiments, VRM 130 acts as footer or header to control power supply to a group of circuits on the processor chip (a "logic island"). In one embodiment, a logic island can be configured any desired logic group, such as a unit, core, chiplet, cache, and/or input/output groups.

So configured, the embodiments disclosed herein provide advantages that overcome the drawbacks associated with previous approaches. For example, through largely available silicon area and interconnect wires on a 3D chip, VRM 130 can be configured as large as desired to ensure high quality power supply lines with low IR drop and high noise immunity.

Moreover, modular power delivery provided by the embodiments disclosed herein enables individual voltage adjustment as well as powering on/off individual cores/functions independently. Accordingly, systems employing the embodiments disclosed herein enjoy additional flexibility for static and dynamic frequency scaling. Further, the embodiments disclosed herein can contribute to eliminating leakage power totally on unused cores/functions, by completely turning off their power supplies.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A voltage regulator module (VRM), comprising:
    a first interface configured to couple to a first substrate interface at a first voltage, wherein the first substrate interface is configured to couple to an integrated circuit substrate;
    a second interface configured to couple to a first processor interface at a second voltage, wherein the first processor interface is configured to couple to a processor, the processor being independent from the integrated circuit substrate;
    a first regulator module coupled to the first interface and to the second interface;
    a third interface configured to couple to a second substrate interface at a third voltage, wherein the second substrate interface is configured to couple to the integrated circuit substrate;
    a fourth interface configured to couple to a second processor interface at a fourth voltage;
    a second regulator module coupled to the third interface and to the fourth interface;
    the first regulator module configured to receive power at the first interface, to convert power to the second voltage, and to deliver power to the first processor interface at the second voltage;
    the second regulator module configured to receive power at the third interface, to convert power to the fourth voltage, and to deliver power to the second processor interface at the fourth voltage; and
    wherein the first regulator module is configured to receive a first control signal from the processor to control delivery of power to the first processor interface;
    wherein the second regulator module is configured to receive a second control signal from the processor to control delivery of power to the second processor interface independently of power delivered by the first regulator module;
    wherein each of the first and second regulator modules comprises a local sensing and feedback module to measure the first and second voltages at the respective first and second processor interfaces and adjust the power to provide the first and second voltages at the respective first and second processor interfaces; and
    wherein each of the first and second regulator modules comprises:
        a linear voltage regulator;
        a micro-regulator, wherein an input to the micro-regulator is coupled to a feedback loop of the linear voltage regulator; and
        a plurality of decoupling capacitors.

2. The VRM of claim 1, wherein the first substrate interface and the first processor interface are Controlled Collapse Chip Connection (C4) interfaces.

3. The VRM of claim 1, wherein the first voltage and the third voltage are the same.

4. The VRM of claim 1, wherein the second interface operates in communication with the fourth interface.

5. The VRM of claim 1, wherein the first regulator module is further configured to cut power to the second interface in response to the first control signal received from the processor, and wherein the second regulator module is further configured to cut power to the fourth interface in response to the second control signal received from the processor independently of delivery of power by the first regulator module.

6. The VRM of claim 1, wherein a Through Silicon Via (TSV) is configured to couple the first interface to the second interface.

7. The VRM of claim 1, further comprising a dummy load module.

8. A method for providing power to a processor, the method comprising:
    providing a voltage regulator module (VRM) between an integrated circuit substrate and a processor module, the processor module being independent from the integrated circuit substrate, and the VRM configured to:
    receive power from a first substrate interface at a first voltage, the first substrate interface being coupled to the integrated circuit substrate;
    receive a first control signal from the processor module;
    regulate received power at the first voltage to generate power at a second voltage at a first processor interface based on the first control signal, the first processor interface coupled to the processor module;

measure a voltage at the first processor interface and adjust the power provided at the first processor interface to provide the second voltage;
  receive power from a second substrate interface at a third voltage, the second substrate interface being coupled to the integrated circuit substrate;
  receive a second control signal from the processor module;
  regulate received power at the third voltage to generate power at a fourth voltage at a second processor interface based on the second control signal, the second processor interface coupled to the processor module; and
  measure a voltage at the second processor interface and adjust the power provided at the second processor interface to provide the fourth voltage; and
 independently providing regulated power to the processor module at the respective first and second processor interfaces based on the first and second control signals; and
 wherein the VRM comprises:
  a linear voltage regulator;
  a micro-regulator, wherein an input to the micro-regulator is coupled to a feedback loop of the linear voltage regulator; and
  a plurality of decoupling capacitors.

9. The method of claim 8, wherein the first voltage and the third voltage are the same.

10. A method for providing power to a processor, the method comprising:
 providing a voltage regulator module (VRM) between an integrated circuit substrate and a processor module, the processor module being independent from the integrated circuit substrate, and the VRM configured to:
  receive power from a first substrate interface at a first voltage; the first substrate interface being coupled to the integrated circuit substrate;
  receive a first control signal from the processor module;
  regulate received power at the first voltage to generate power at a second voltage at a first processor interface based on the first control signal, the first processor interface coupled to the processor module;
  measure a voltage at the first processor interface and adjust the power provided at the first processor interface to provide the second voltage;
  receive power from a second substrate interface at a third voltage, the second substrate interface being coupled to the integrated circuit substrate;
  receive a second control signal from the processor module;
  regulate received power at the third voltage to generate power at a fourth voltage at a second processor interface based on the second control signal, the second processor interface coupled to the processor module; and
  measure a voltage at the second processor interface and adjust the power provided at the second processor interface to provide the fourth voltage; and
 providing regulated power to the processor module at the first and second processor interfaces;
 wherein the processor module comprises a processor, the processor comprising first and second logic groups, the first logic group coupled to the first processor interface, the second logic group coupled to the second processor interface; and
 wherein providing regulated power to the processor module comprises independently delivering power to the respective first and second logic groups via the first and second control signals; and
 wherein the VRM comprises:
  a linear voltage regulator;
  a micro-regulator, wherein an input to the micro-regulator is coupled to a feedback loop of the linear voltage regulator; and
  a plurality of decoupling capacitors.

11. The method of claim 10, wherein the first voltage and the third voltage are the same.

* * * * *